B. F. STOCKFORD.
Dinner-Kettle.
No. 205,769.                     Patented July 9, 1878.
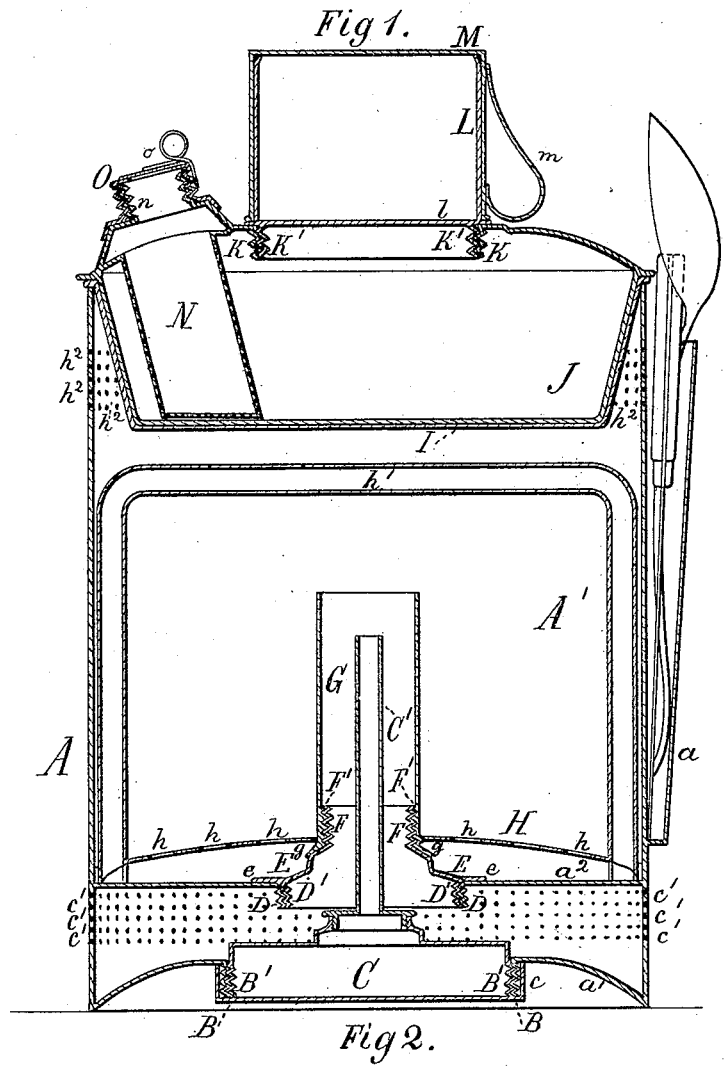

UNITED STATES PATENT OFFICE.

BENJAMIN F. STOCKFORD, OF SOUTH BEND, INDIANA.

IMPROVEMENT IN DINNER-KETTLES.

Specification forming part of Letters Patent No. 205,769, dated July 9, 1878; application filed June 14, 1878.

*To all whom it may concern:*

Be it known that I, BENJAMIN F. STOCKFORD, of South Bend, in the county of St. Joseph and State of Indiana, have invented a new and useful Improvement in Dinner-Kettles, which improvement is fully set forth in the following specification and accompanying drawings, in which latter—

Figure 1 is a vertical central section of my improved dinner-kettle. Fig. 2 is a sectional detail view of a lamp used to heat the contents of the kettle. Fig. 3 is a central section of a screw-plug for closing up the diaphragm of the kettle when the lamp is removed therefrom. Fig. 4 is a central section of a screw-cap used for closing up the central part of an annular screw-hood fitted into an opening in the horizontal diaphragm of the kettle. Fig. 5 is a central section of a screw-cover constructed as a strainer and used to close the opening in the diaphragm of the kettle when the hood is removed. Fig. 6 is a detail view of a hook used to remove a heat-distributing apparatus from the kettle.

The nature of my invention consists in certain constructions, combinations, and arrangements of parts, hereinafter fully described and specifically claimed, whereby a dinner-kettle is produced which serves as a receptacle for the requisites of a dinner and the necessary domestic utensils, and provides means for heating or cooking such dinner, and for boiling tea, coffee, or other liquids, and which will serve as a vessel for carrying and straining milk.

In the drawing, A represents a kettle, provided with a receptacle, $a$, on its outside for a knife, fork, and spoon, and having a horizontal diaphragm, $a^2$, a short distance above its bottom $a^1$. The bottom $a^1$ of the kettle is of convex shape, and is in the center provided with a ring-screw, B, which is made of zinc and soldered to the bottom.

By employing zinc metal for making the screw B, rapid decay from rust is prevented, as moisture is not so rapidly destructive to zinc as to tin, of which the kettle and its principal parts are made.

Into the ring-screw B another ring-screw, B', of the same metal, is fitted. A plain upward extension of this ring-screw B' forms the upright part of a lamp-reservoir, C, Fig. 2, the bottom of which is provided with an annular rim, $c$, of larger diameter than the screw B', by which the ring-screw B is surrounded and protected.

The tube C' of the reservoir C is of suitable height and size, and in practice will contain a wick for supplying alcohol from the reservoir C. Between the bottom $a^1$ and diaphragm $a^2$ the kettle is provided with perforations $c'$, whereby fresh air is admitted to the flame of the lamp. The diaphragm $a^2$ is provided with a central ring-screw, D, made of zinc and securely soldered in place. Into this ring-screw another ring-screw, D', of zinc metal, is fitted, a contracted upward extension of which forms an annular hood, E, having a ring-screw, F, of zinc, soldered to its top. Upon the ring-screw F another ring-screw, F', which is soldered to the inside of the lower end of a metal chimney, G, is fitted. The hood E has a flange, $e$, sufficiently broad to effect a water-tight joint with the bottom $a$ when screwed down upon it. A packing device similar to $e$ is provided on the chimney G by means of a flange, $g$.

By constructing the parts as described, the zinc screws are covered entirely by metal, such as tin, and thus the acid moisture of eatables or contents of the kettle are prevented from coming in contact with the zinc and causing a poisonous oxidation to form on the screws.

Within the kettle, above the diaphragm $a^2$, is placed a removable convex plate, H, provided with perforations $h$ and a bail-shaped pipe, $h^1$, which is open at the bottom below the plate.

By means of this device air in the pipe $h^1$ can be heated by the flame of the lamp above the chimney, and caused to circulate down under the plate, and up through the holes $h$ therein, and thereby heat the contents of the kettle in an equable manner.

The kettle A, near its top, is provided with a number of perforations, $h^2$, which serve as draft-passages for the lamp, and for conducting the smoke or combustion-gases out of the kettle.

In the upper end of the kettle A a deep pan, I, is fitted. This pan is of conical shape, in order to allow room between it and the kettle for the escape of gases, and to permit the heat to pass all around it. Into this pan I a vessel, J, is fitted, of a size corresponding to its interior diameter. The top of the vessel J has a central opening in it, around which a ring-screw, K, is fastened, and into which ring-screw K another ring-screw, K', soldered to the flanged bottom $l$ of a cup, L, is fitted.

A common drinking-cup, M, with a handle, $m$, is placed over the cup L, as shown. Near the side of the vessel J, in the top, an opening is made, and at this opening a cylindrical strainer, N, is fastened within the vessel.

Around the opening to the strainer a ring-screw, $n$, with a screw-cap, O, is provided.

The screw-cap O has a spring safety-valve, $o$, which is forced open by an undue pressure of steam within the vessel J, and thus danger of an explosion is avoided.

In the use of the kettle for warming a dinner, the pan I or the vessel J may be sufficiently heated by the flame of the alcohol-lamp shown in Fig. 1; but when it is desired to use the kettle for baking, frying, or toasting, the pan I is to be heated for these purposes, and for boiling the vessel J is to be brought into use, a coal-oil lamp, P, being substituted for the alcohol-lamp for such purposes.

The reservoir C of the coal-oil lamp P (shown in Fig. 2) is constructed precisely like the reservoir of the alcohol-lamp, and is attached to the bottom $a$ of the kettle in the same manner.

The burner $C^2$ of the lamp P is of ordinary construction, and provided with a chimney, $p$.

The chimney $p$ is of greater diameter than the central opening in the plate H, and hence this plate and its attachments are removed from the kettle when the coal-oil lamp is used.

In Fig. 3, I have shown a screw-plug, Q, for plugging up the opening in the diaphragm $a^2$ when the respective lamps are removed, and by thus closing this opening the kettle is capable of holding liquids without leaking.

The ring-screw D' of this plug Q is of the same construction as that of the hood E, and its operation is also the same.

A strainer, R, is shown in Fig. 5, having a ring-screw, D', and a central straining-screen, $r$. This strainer is screwed into the diaphragm $a^2$ for the purpose of straining milk.

The screw-cap S (seen in Fig. 4) serves to close up the hood E when the alcohol-lamp and the chimney are removed, and it may also be screwed upon the screw $n$ of the vessel J, instead of the safety-cap O, which is placed in the kettle during transportation to protect it from injury.

Fig. 6 shows a hook, T, whereby the tube $h^1$ and plate H are lifted from the kettle.

Operation: If an ordinary cooked dinner is to be "warmed over," the alcohol-lamp is screwed into the bottom $a^1$, and the annular hood E with the chimney G into the diaphragm $a^2$, and the plate H with pipe $h^1$ inserted, as shown. The dinner is then placed in the chamber A' upon the plate H around the chimney G, the lamp lighted, and the kettle closed by the pan I or the vessel J, accordingly as the circumstances of the case may require.

If soup is to be warmed, the pan I will be used as the top of the kettle, and if coffee or tea is in the vessel J, then this vessel will be used as such top.

If it is desirable to either stew, fry, or boil, the alcohol-lamp, plate H, and pipe $h^1$ are removed and the coal-oil lamp substituted, and thus the requisite heat obtained.

During the use of the coal-oil lamp the food is removed from the inside of the kettle, where the same would become impregnated with the odor of the coal-oil and its gas.

When coffee or tea is to be boiled, the cups L M are removed from the vessel J, and water and tea or coffee introduced through the opening in the top of the vessel, and then, either with the cup L or the lid Q, this opening is closed.

The coffee or tea is drawn from the vessel J through the strainer N, and the opening covered by the cap O, which cap is removed for this purpose.

The vessel J is cleaned out through the opening covered by the cup L.

When the lamp and other inner attachments of the kettle are removed, and the strainer shown in Fig. 5 placed in the diaphragm $a^2$, the kettle will answer for straining milk, and when the hood E is in place and the cap shown in Fig. 4 is screwed on it, the kettle will answer for holding milk or other fluids.

Having thus described my invention, what I claim as new, and desire to secure by Letters Patent of the United States, is—

1. A dinner-kettle provided with a removable chambered top, I or J, or both, a screw-threaded aperture as at B, in its bottom $a^1$, for the introduction of a lamp, $c$, a diaphragm, $a^2$, with a screw-threaded aperture through it, as at D, for the admission of the lamp burner and chimney, or of devices such as E Q R, a chamber, A', for receiving food, and inlet and outlet draft-passages $c'$ $h^2$, substantially as and for the purposes described.

2. The combination, with the dinner-kettle having a centrally-perforated bottom, $a^1$, and a centrally-perforated diaphragm, $a^2$, of the screw-threaded hood E F, whereby the chimney G and the lamp C may be employed, or the lamp shown in Fig. 2 substituted for the one shown in Fig. 1, or either of the devices Q R S used, as occasion requires, substantially as and for the purpose described.

3. The combination, with the dinner-kettle having a centrally-perforated bottom, $a^1$, and perforated diaphragm $a^2$, for the purpose described, of the convex perforated plate H, and bail-shaped tube $h^1$, substantially as described.

4. The combination of the depressed flaring pan I, which closes the top of the dinner-kettle, the draft-passages $c'$ $h^2$ in the sides of the kettle, diaphragm $a^2$, lamp C, and bottom $a^1$, substantially as shown and described.

5. The vessel-cover J, of flaring form, provided with a supply-opening and with a discharging-opening, the latter having a strainer beneath it, in combination with the draft-passages in the sides of the kettle, and the perforated diaphragm $a^2$, bottom $a^1$, and lamp C, substantially as described.

6. The dinner-kettle having its screw-connections in the food and lamp sections formed of zinc, and the joints formed by these connections covered with the metal of which the body of the kettle is formed, substantially as shown and described.

BENJAMIN F. STOCKFORD.

Witnesses:
A. S. DUNBAR,
GEO. H. ALWARD.